(12) United States Patent
Cromer et al.

(10) Patent No.: US 6,988,196 B2
(45) Date of Patent: Jan. 17, 2006

(54) COMPUTER SYSTEM AND METHOD FOR GENERATING A DIGITAL CERTIFICATE

(75) Inventors: Daryl Carvis Cromer, Apex, NC (US); Brandon Jon Ellison, Raleigh, NC (US); Howard Jeffrey Locker, Cary, NC (US); Andy Lloyd Trotter, Raleigh, NC (US); James Peter Ward, Raleigh, NC (US)

(73) Assignee: Lenovo (Singapore) Pte Ltd, Singapore (SG)

( * ) Notice: Subject to any disclaimer, the term of this patent is extended or adjusted under 35 U.S.C. 154(b) by 706 days.

(21) Appl. No.: 09/748,654

(22) Filed: Dec. 22, 2000

(65) Prior Publication Data

US 2002/0080973 A1    Jun. 27, 2002

(51) Int. Cl.
*H04L 9/00*    (2006.01)

(52) U.S. Cl. ..................... 713/156; 713/155
(58) Field of Classification Search ........... 713/200, 713/174, 156, 167, 175, 189–194, 155
See application file for complete search history.

(56) References Cited

U.S. PATENT DOCUMENTS

| 5,218,637 | A |   | 6/1993 | Angebaud et al. |
| 5,844,986 | A | * | 12/1998 | Davis .................. 713/187 |
| 5,872,849 | A |   | 2/1999 | Sudia |
| 6,175,924 | B1 | * | 1/2001 | Arnold ................. 713/189 |
| 6,233,685 | B1 | * | 5/2001 | Smith et al. ........... 713/194 |
| 6,519,700 | B1 | * | 2/2003 | Ram et al. ............ 713/193 |
| 6,615,350 | B1 | * | 9/2003 | Schell et al. .......... 713/168 |

* cited by examiner

Primary Examiner—Gilberto Barron, Jr.
Assistant Examiner—Thomas Ho
(74) Attorney, Agent, or Firm—Andrew J. Dillon; Scott W. Reid

(57) ABSTRACT

A computer system and method are disclosed for generating a certificate that can be validated against a trusted hardware subsystem within a computer system. A security subsystem is established within the computer system. A master key pair including a master public key and master private key are established. The master private key is stored in protected storage within the security subsystem such that the master private key is inaccessible outside of the security subsystem. Generation of a self-verifying certificate is requested. A user of the computer system is then prompted to enter an authentication code in response to the request for generation of the certificate. A certificate is generated utilizing the master key pair only in response to a correct entry of the authentication code. The certificate is used only internally within the computer system.

18 Claims, 4 Drawing Sheets

COMPUTER SYSTEM AND METHOD FOR GENERATING A DIGITAL CERTIFICATE

BACKGROUND OF THE INVENTION

1. Field of the Invention

The present invention relates in general to data processing systems and, in particular, to a computer system and method for generating a self-verifying certificate. Still more particularly, the present invention relates to a computer system and method to generate a self-verifying certificate for use only within the computer system for authenticating internal operations, wherein only the system administrator can create the certificate.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's NetVista series, Aptiva series, and Intellistation series.

Encryption algorithms are known to ensure that only the intended recipient of a message may read and access the message. One known encryption algorithm is an asymmetric, or public key, algorithm. The public key algorithm is a method for encrypting messages sent from a first entity to a second entity. This algorithm provides for a key pair comprised of a private key and public key which are mathematically related such that if the private key is used to encrypt data then only the matched public key can be used to decrypt the data, and visa versa.

Inherent in a public key encryption algorithm is the need for strong trust relationships. Individual trust relationships are typically enabled through a Certificate Authority (CA). A Certificate Authority is a mutually trusted agent that vouches for the authenticity of a sender of a message, which may be either a group or an individual.

In Intranet, Internet, Virtual Private Networks, e-mail, and e-commerce applications, communication connections may traverse backbones and routers as well as machines at secured or non-secured sites. In certain circumstances, it is imperative that users of the above-referenced applications employ systems and methods which provide for secure transactions and communications.

A Public Key Infrastructure (PKI), a system for using public key methodologies, enables users of an essentially non-secured public network, such as the Internet, to securely and privately exchange information and authenticate identities using a public/private cryptographic key pair.

Certificate Authorities are entities that can issue digital certificates. Certificate Authorities are, in essence, a commonly trusted third party that is relied upon to verify the matching of public keys to identity, e-mail name, or other such information.

A digital certificate may be described as an attachment to an electronic message used for security purposes which establishes credentials when doing business or other transactions on the Web. Digital certificates link details about an individual, or an organization to a public key, and are able to identify individuals, or organizations. A common use of a digital certificate is to verify that a user sending a message is the person the user claims to be. The digital certificate may contain your name, a serial number, expiration dates, a copy of the certificate holder's public key, and the digital signature of a Certificate Authority. The digital certificate contains the digital signature of the CA so that anyone can verify that the certificate is real.

Certificates are beneficial when two entities both trust the same CA. This allows them to learn each other's public key by exchanging a certificate signed by that CA. A digital signature is an electronic signature, rather than a written signature, that can be used by someone to authenticate the identity of the sender of a message or of the signer of a document. It can also be used to ensure that the original content of a message or document that has been conveyed is unchanged. A digital signature can be used with any kind of message, whether it is encrypted or not, simply so that the receiver can be sure of the sender's identity and that the message has arrived in the manner intended by the sender. When a public key is known, it can be used to encrypt data, individuals can send it to one another, or it can be used to verify signatures on documents.

Directory services in the PKI include one or more directories where the certificates (with their public keys) are held. A registration authority is an authority in a network that acts as the verifier for the CA before a digital certificate is issued to a requestor. The registration authority tells the CA to issue the certificate if the verification process so dictates.

Individuals who desire to send an encrypted message can request a digital certificate from a CA. The CA can issue a signed digital certificate containing the applicant's public key and other identification information. The CA may make its own public key readily available through print materials, through the Internet, or via other means.

The recipient of an encrypted message uses the CA's public key to decode the digital certificate attached to the message, verifies it as issued by the CA and then obtains the sender's public key and identification information held within the certificate.

A certificate is typically requested by a user through an application such as a browser or email. The certificate request, and target Public Key utilized to create the certificate, is routed to the CA. After the identity of the requester is verified, the CA generates the certificate. The certificate is then returned to the requester and installed into their system.

The certificates and certificate authority of the prior art are utilized when information is transmitted from one computer system to another computer system that is separate from the transmitting computer system. Therefore, the certificates are transmitted externally from one computer system across some type of network and are received by another computer system.

Therefore a need exists for a method and system to build a trust relationship internally within a single computer system by generating a self-verifying certificate for use only within the computer system to establish trust for internal purposes.

SUMMARY OF THE INVENTION

A computer system and method are disclosed for generating a certificate that can be internally generated and verified for trust. A security subsystem is established within the computer system. A master key pair including a master public key and master private key are established. The master private key is stored in protected storage within the security subsystem such that the master private key is inaccessible outside of the security subsystem. Generation of a self-verifying certificate is requested. A user of the computer system is then prompted to enter an authentication code in response to the request for generation of the self-verifying certificate. A self-verifying certificate is generated utilizing the master key pair only in response to a correct entry of the authentication code. The validity of this certificate can be ascertained by checking the certificate against the master public key security subsystem.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

Although the present invention may be implemented using any suitably configured computer system which includes the components described below, the preferred implementation uses a NetVista computer platform computer system and includes the components described below. A NetVista computer platform computer system is available from International Business Machines. The method of the present invention can be implemented on a variety of platforms such as defined by the Trusted Computing Platform Alliance specification.

The present invention is a method and system for permitting a computer system to create a virtual certificate to be used within the computer system. Only an authorized administrator is permitted to cause the creation of these certificates. The certificates may be used subsequently by applications internally to the computer system to authenticate the validity of a credential.

A security subsystem is established within the computer system. The security subsystem includes protected storage. A master key pair is established including a master private key and a master public key. The master private key is stored in non-readable, protected storage included within the computer system. The master public key is stored in protected read-only storage in this security subsystem. An authentication code is required in order to cause the generation of a self-verifying certificate. Only the system administrator possesses this authentication code. Therefore, only the system administrator can cause the computer system to generate a self-verifying certificate. Trust is thereby established in the certificates because only the administrator could have caused a certificate to be created.

A public key for the target virtual certificate is supplied to the security subsystem. The system administrator then needs to provide the authorization code for the hardware private key to sign the target public key. This signed target public key is then appended to the target public key data structure to form a virtual certificate.

Those skilled in the art will recognize that the certificate may also be used to allow exchange of data and information in a trusted manner among a group of computer systems which trust the source of the certificate. These computer systems trust the source of this certificate because the certificate was generated by an administrator having the authentication code who then generated the certificate using the hardware security subsystem.

Figure 1:
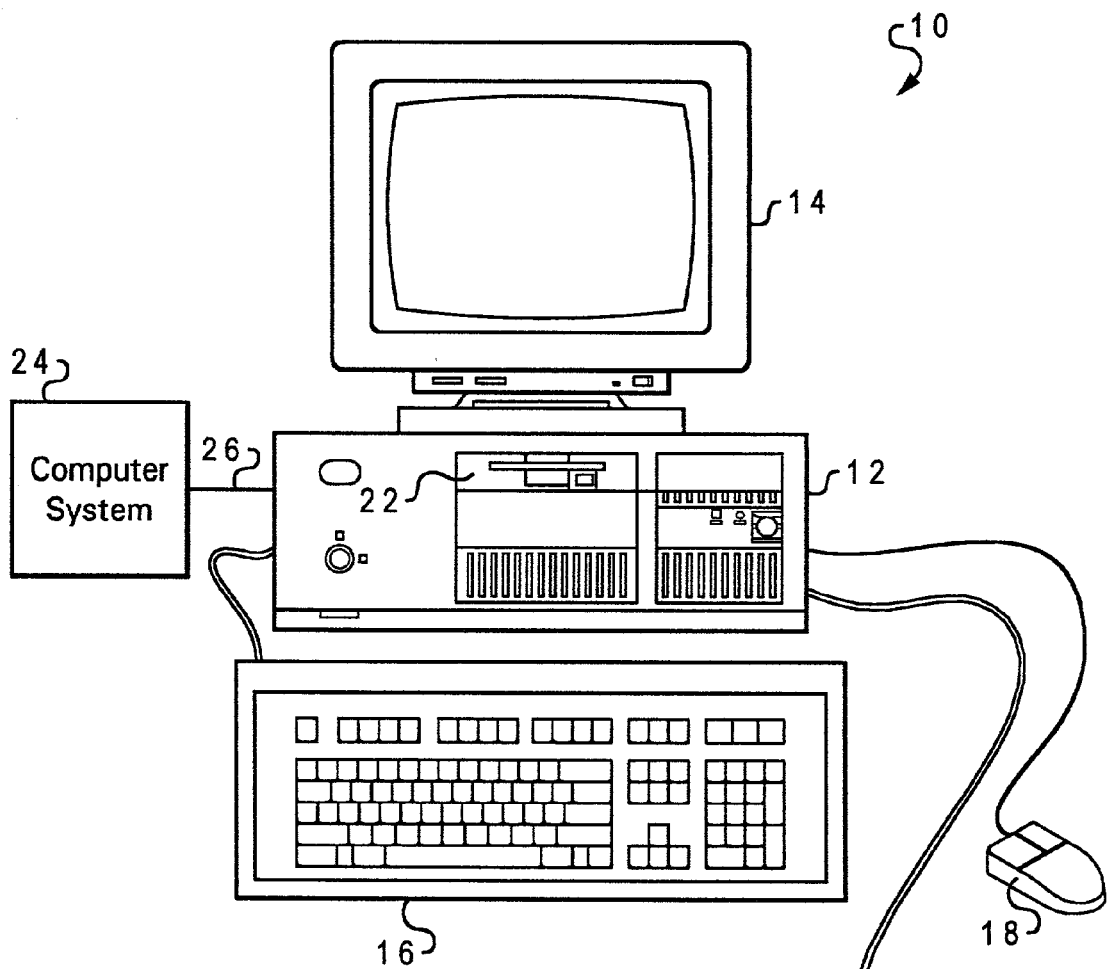
FIG. 1 illustrates a pictorial representation of a data processing system including a first computer system coupled to a second computer system utilizing a network in accordance with the method and system of the present invention.
Figure 1:
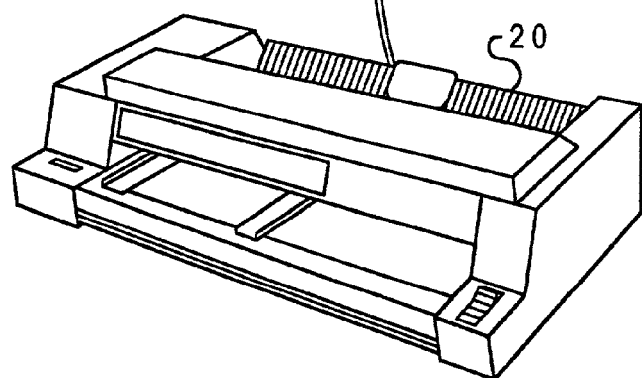

FIG. 1 illustrates a pictorial representation of a computer system 10 in accordance with the method and system of the present invention. Computer system 10 includes a computer 12, a monitor 14, a keyboard 16, a mouse 18, a printer or plotter 20, and a floppy disk drive 22. Computer system 10 may be implemented utilizing any commercially available computer system which has been suitably programmed and which has been modified as described below. Computer system 10 is capable of receiving a variety of different types of inputs from a variety of different types of input devices. Keyboard 16 and mouse 18 are two such types of input devices. Computer system 10 may be coupled to another computer system 24 utilizing a network 26.

Figure 2:
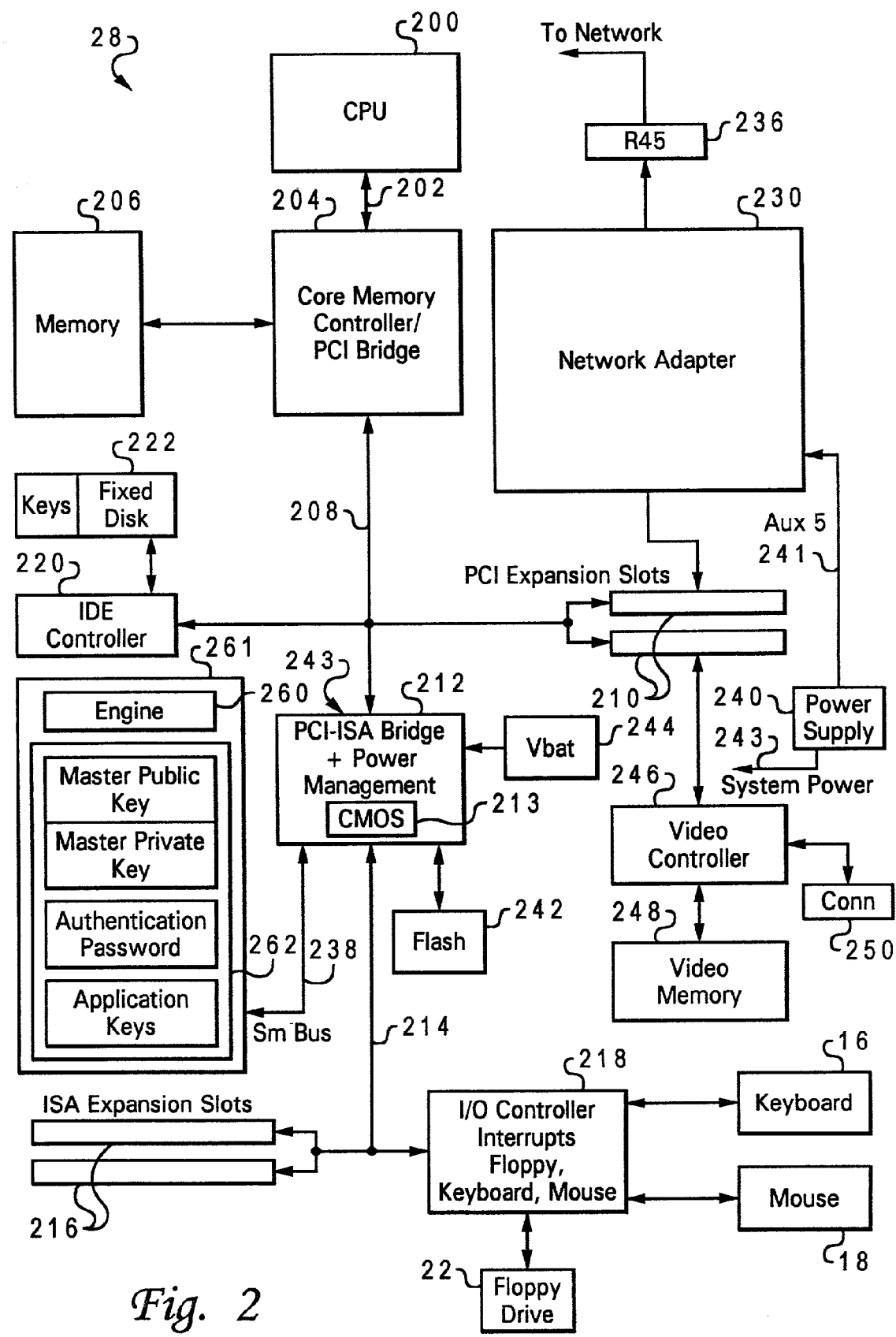
FIG. 2 depicts a more detailed pictorial representation of either computer system of FIG. 1 in accordance with the method and system of the present invention.

FIG. 2 depicts a more detailed pictorial representation of a computer system of FIG. 1 in accordance with the method and system of the present invention. A computer system includes a planar 28 (also commonly called a motherboard or system board) which is mounted within the computer and provides a means for mounting and electrically interconnecting various components of the computer including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic 212. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 22, keyboard 16, and mouse 18 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

The computer system also includes a video controller 246 which may, for example, be plugged into one of PCI expansion slots 210. Video controller 246 is connected to video memory 248. The image in video memory 248 is read by controller 246 and displayed on monitor 14 which is connected to connector 250.

The computer system includes a network adapter 230 which may, for example, be plugged into one of the PCI connector slots 210 (as illustrated) or one of the ISA connector slots 216 in order to permit computer system 10 to communicate with a LAN via a connector 236.

Computer system 10 includes a special power supply 240 which supplies full normal system power 243, and has an auxiliary power main AUX 5 247 which supplies full time auxiliary power 247 to the power management logic 212 and to the network adapter 230. This enables computer system 10 to respond to a wakeup signal from network adapter 230. In response to a receipt of the wakeup signal, normal system power 243 from power supply 240 is turned on and then powers up computer system 10.

In accordance with the present invention, planar 28 includes an application specific integrated circuit (ASIC) security subsystem 261 which includes an encryption/decryption engine 260 which includes an encryption/decryption algorithm which may be utilized to encode and decode messages transmitted and received by planar 28 and protected storage 262. Engine 260 is preferably an RSA public key crypto-system. Engine 260 may access a protected storage device 262. Protected storage device 262 is accessible only through engine 260. Therefore, storage device 262 cannot be read or written to by planar 28, device 222, or any other device. Storage device 262 is utilized to store the master key pair for this planar, and to store the authentication code. Storage device 262 may also be utilized to store application keys.

Device 262 may be implemented utilizing an electronically erasable storage device, such as an EEPROM. Access may be gained to non-readable storage device 262 in order to initially store the master private key. The EEPROM storage locations can be initialized and then changed to "no access", "read-only", or "read-write". After the master private key is stored, its storage location is changed to "no access". The master public key is also stored in storage 262. Its location is "read-only" so that the master public key may be read.

Security subsystem 261 is coupled to PCI-ISA bridge 212 utilizing a system management (SM) bus 238. System management bus 238 is a two-wire, low speed, serial bus used to interconnect management and monitoring devices.

Figure 3:
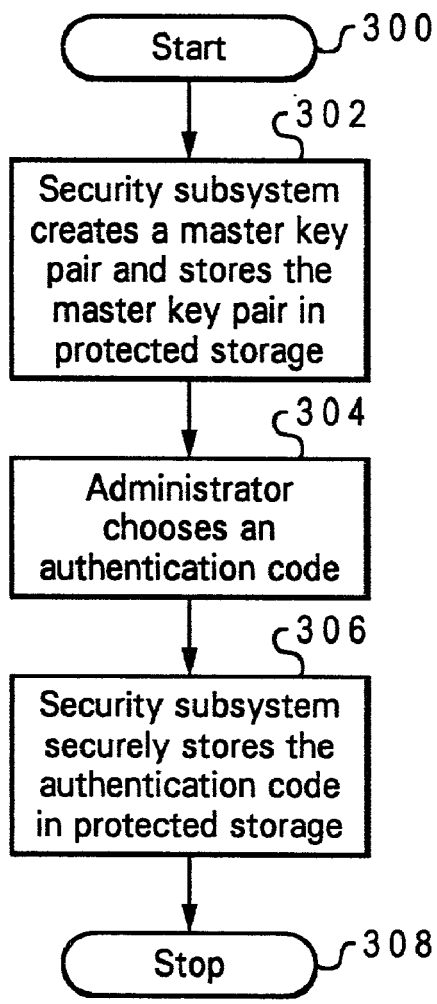
FIG. 3 illustrates a high level flow chart which depicts initializing a security subsystem included in a computer system in accordance with the method and system of the present invention.

FIG. 3 illustrates a high level flow chart which depicts initializing a security subsystem included in a computer system in accordance with the method and system of the present invention. The process starts as depicted by block 300 and thereafter passes to block 302 which illustrates the security subsystem 261 creating a master key pair and storing the master key pair in protected storage 262. Block 304, then, illustrates an administrator choosing an authentication code. Thereafter, block 306 depicts the security subsystem 261 securely storing the authentication code in protected storage 262. The authentication code can be changed only by the administrator. The process then terminates as illustrated by block 308.

Figure 4:
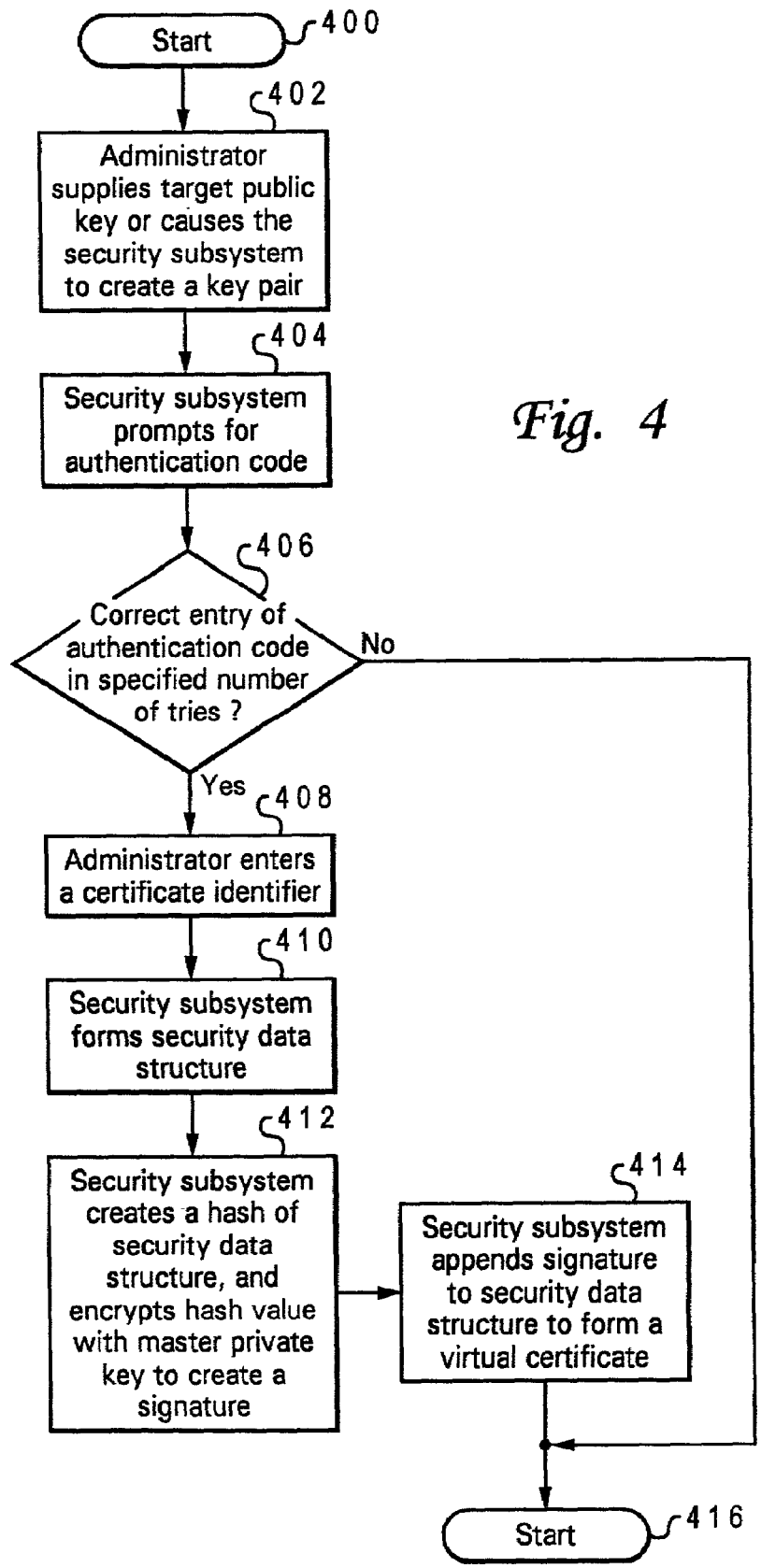
FIG. 4 depicts a high level flow chart which illustrates generating a self-verifying certificate in accordance with the method and system of the present invention.

FIG. 4 illustrates a high level flow chart which depicts generating a self-verifying certificate in accordance with the method and system of the present invention. The process starts as depicted by block 400 and thereafter passes to block 402 which illustrates an administrator supplying a target public key to the security subsystem. Alternatively, the administrator may cause the security subsystem to create a target key pair which includes a public key to be used as a target public key. This target key pair is different from the master key pair. The target key pair is a second, completely separate, key pair. Thereafter, block 404 depicts security subsystem 261 prompting for an authentication code. Next, block 406 illustrates a determination of whether or not the correct authentication code was entered within the required number of attempts to correctly enter the code. If a determination is made that the correct authentication code was not correctly entered within the required number of tries, the process terminates as depicted by block 416.

Referring again to block 406, if a determination is made that the correct authentication code was correctly entered within the required number of tries, the process passes to block 408 which depicts the administrator entering a certificate identifier to identify this certificate which is to be created. Each certificate receives a certificate identifier so that the identifier can be used later within the computer system by an application. For example, an administrator could create multiple, different certificates. A certificate could be created to be used when, for example, an application is copying application keys. This certificate would be identified by a particular identifier. A different certificate could be created to be used when backing up application keys. This certificate would be identified by its own, unique identifier. An application could obtain a particular certificate by requesting a certificate identified by a particular identifier.

Next, block 410 illustrates the security subsystem forming security data. The security data includes a public key, the certificate identifier, and other fields known in the art to be included in a certificate. Thereafter, block 412 depicts the security subsystem creating a hash of the security data structure, and encrypting the resulting hash value with the master private key to create a signature. Block 414 depicts the security subsystem appending the signature to the security data structure to form a virtual certificate. The process then terminates as illustrated by block 416.

Figure 5:
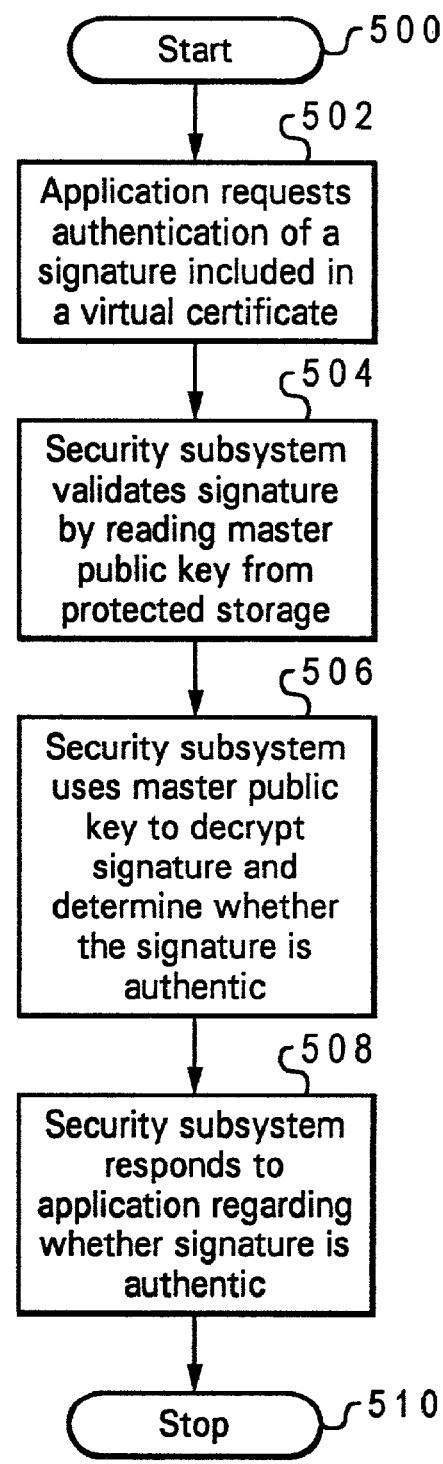
FIG. 5 illustrates a high level flow chart which depicts an example of using a virtual certificate in accordance with the method and system of the present invention.

FIG. 5 illustrates a high level flow chart which depicts an example of using a virtual certificate in accordance with the method and system of the present invention. The process starts as depicted by block 500 and thereafter passes to block 502 which illustrates an application requesting authentication of a signature included in a virtual certificate. For example, an application may attempt to restore applications keys which were previously stored in hard disk 222. These application keys had been stored on disk 222 along with a certificate. An application might later need to verify that the certificate stored along with these keys is authentic.

Next, block 504 depicts the security subsystem validating the signature by reading the master public key from protected storage 262. Thereafter, block 506 illustrates the security subsystem using the master public key to decrypt the signature and determining whether the signature is authentic. Block 508, then, depicts the security subsystem responding to the application regarding whether the signature is authentic. The process then terminates as illustrated by block 510.

While a preferred embodiment has been particularly shown and described, it will be understood by those skilled in the art that various changes in form and detail may be made therein without departing from the spirit and scope of the present invention.

What is claimed is:

1. A method in a computer system for employing a digital certificate, for use only within said computer system, to authenticate operations internal to said computer system, said method comprising:
   storing a master key pair and data specifying an authentication code in a protected storage within a security subsystem, wherein said master key pair comprises a first private key and a first public key and said first private key and said authentication code are inaccessible outside of said security subsystem;
   receiving a request to generate a digital certificate at said security subsystem;
   generating a user prompt for said authentication code in response to a receipt of said request to generate said digital certificate;
   receiving a reply from a user in response to a generation of said user prompt; and
   processing said request to generate said digital certificate in response to a receipt of said reply, wherein said processing comprises
      generating said digital certificate utilizing said first private key only if said reply is determined to correctly specify said authentication code, wherein
   said digital certificate comprises data specifying a second public key of a target key pair.

2. The method of claim 1, wherein said request to generate said digital certificate comprises said data specifying said second public key.

3. The method of claim 1, wherein generating said digital certificate comprises:
   comparing data of said reply to said authentication code; and
   generating said digital certificate in response to a comparison of said data of said reply and said authentication code.

4. The method of claim 1, wherein generating said digital certificate comprises:
   performing a bashing operation on said data specifying said second public key to produce a hashed value;
   performing an encryption operation on said hashed value utilizing said first private key to produce an digital signature; and
   appending said digital signature to said second public key to produce said digital certificate.

5. The method of claim 1, wherein generating said digital certificate comprises:
   appending a certificate identifier to said second public key to produce security data, wherein said certificate identifier uniquely identifies said digital certificate within said computer system;
   performing a hashing operation on said security data to produce a hashed value;
   performing an encryption operation on said hashed value utilizing said first private key to produce an digital signature; and appending said digital signature to said security data to produce said digital certificate.

6. The method of claim 4, further comprising:
   receiving a request to validate said digital certificate;
   accessing said first public key within said protected storage;
   performing a decryption operation on said digital signature utilizing said first public key to produce a first hashed value;
   performing said hashing operation on said second public key to produce a second hashed value; and
   comparing said first bashed value and said second hashed value.

7. A computer system for employing a digital certificate for use only within said computer system to authenticate operations internal to said computer system, said computer system comprising:
   means for storing a master key pair and data specifying an authentication code in a protected storage within a security subsystem, wherein said master key pair comprises a first private key and a first public key and said first private key and said authentication code are inaccessible outside of said security subsystem;
   means for receiving a request to generate a digital certificate at said security subsystem;
   means for generating a user prompt for said authentication code in response to a receipt of said request to generate said digital certificate;
   means for receiving a reply from a user in response to a generation of said user prompt; and
   means for processing said request to generate said digital certificate in response to a receipt of said reply, wherein said means for processing comprises
      means for generating said digital certificate utilizing said first private key only if said reply is determined to correctly specify said authentication code, wherein
   said digital certificate comprises data specifying a second public key of a target key pair.

8. The computer system of claim 7, wherein said request to generate said digital certificate comprises said data specifying said second public key.

9. The computer system of claim 7, wherein means for generating said digital certificate comprises:
   means for comparing data of said reply to said authentication code; and
   means for generating said digital certificate in response to a comparison of said data of said reply and said authentication code.

10. The computer system of claim 7, wherein said means for generating said digital certificate comprises:
    means for performing a hashing operation on said data specifying said second public key to produce a hashed value;
    means for performing an encryption operation on said hashed value utilizing said first private key to produce an digital signature; and
    means for appending said digital signature to said second public key to produce said digital certificate.

11. The computer system of claim 7, wherein said means for generating said digital certificate comprises:
    means for appending a certificate identifier to said second public key to produce security data, wherein said certificate identifier uniquely identifies said digital certificate within said computer system;

means for performing a hashing operation on said security data to produce a hashed value;

means for performing an encryption operation on said hashed value utilizing said first private key to produce an digital signature; and means for appending said digital signature to said security data to produce said digital certificate.

12. The computer system of claim 10, further comprising:

means for receiving a request to validate said digital certificate;

means for accessing said first public key within said protected storage;

means for performing a decryption operation on said digital signature utilizing said first public key to produce a first hashed value;

means for performing said hashing operation on said second public key to produce a second hashed value; and means for comparing said first hashed value and said second bashed value.

13. A computer-readable medium encoded with a computer program, which when executed by a processor, causes said processor to implement a method in a computer system for employing a digital certificate, for use only within said computer system, to authenticate operations internal to said computer system, said method comprising:

storing a master key pair and data specifying an authentication code in a protected storage within a security subsystem, wherein said master key pair comprises a first private key and a first public key and said first private key and said authentication code are inaccessible outside of said security subsystem;

receiving a request to generate a digital certificate at said security subsystem;

generating a user prompt for said authentication code in response to a receipt of said request to generate said digital certificate;

receiving a reply from a user in response to a generation of said user prompt; and processing said request to generate said digital certificate in response to a receipt of said reply, wherein said processing comprises generating said digital certificate utilizing said first private key only if said reply is determined to correctly specify said authentication code, wherein said digital certificate comprises data specifying a second public key of a target key pair.

14. The computer-readable medium of claim 13, wherein said request to generate said digital certificate comprises said data specifying said second public key.

15. The computer-readable medium of claim 13, wherein generating said digital certificate comprises:

comparing data of said reply to said authentication code; and generating said digital certificate in response to a comparison of said data of said reply and said authentication code.

16. The computer-readable medium of claim 13, wherein generating said digital certificate comprises:

performing a hashing operation on said data specifying said second public key to produce a hashed value;

performing an encryption operation on said hashed value utilizing said first private key to produce an digital signature; and appending said digital signature to said second public key to produce said digital certificate.

17. The computer-readable medium of claim 13, wherein generating said digital certificate comprises:

appending a certificate identifier to said second public key to produce security data, wherein said certificate identifier uniquely identifies said digital certificate within said computer system;

performing a bashing operation on said security data to produce a hashed value;

performing an encryption operation on said hashed value utilizing said first private key to produce an digital signature; and appending said digital signature to said security data to produce said digital certificate.

18. The computer-readable medium of claim 16, said method further comprising:

receiving a request to validate said digital certificate;

accessing said first public key within said protected storage;

performing a decryption operation on said digital signature utilizing said first public key to produce a first hashed value;

performing said bashing operation on said second public key to produce a second hashed value; and comparing said first hashed value and said second hashed value.

\* \* \* \* \*